(12) United States Patent
Fudala et al.

(10) Patent No.: US 11,558,182 B2
(45) Date of Patent: Jan. 17, 2023

(54) METHOD AND SYSTEM TO FACILITATE ASSESSMENT, AUTHORIZATION, AND MONITORING OF POLICY DOCUMENTS RELATED TO AN ORGANIZATION

(71) Applicants: James Mark Fudala, Gainesville, VA (US); Jason Herndon, Front Royal, VA (US)

(72) Inventors: James Mark Fudala, Gainesville, VA (US); Jason Herndon, Front Royal, VA (US)

( * ) Notice: Subject to any disclaimer, the term of this patent is extended or adjusted under 35 U.S.C. 154(b) by 159 days.

(21) Appl. No.: 16/685,887

(22) Filed: Nov. 15, 2019

(65) Prior Publication Data

US 2020/0162241 A1    May 21, 2020

Related U.S. Application Data

(60) Provisional application No. 62/767,617, filed on Nov. 15, 2018.

(51) Int. Cl.
*H04L 9/06* (2006.01)
*H04L 9/32* (2006.01)
*G06F 21/62* (2013.01)
*G06F 21/60* (2013.01)

(52) U.S. Cl.
CPC .......... *H04L 9/0643* (2013.01); *G06F 21/602* (2013.01); *G06F 21/6209* (2013.01); *H04L 9/3231* (2013.01); *H04L 9/3239* (2013.01)

(58) Field of Classification Search
CPC ... H04L 9/0643; H04L 9/3231; H04L 9/3239; G06F 21/602; G06F 21/6209
See application file for complete search history.

(56) References Cited

U.S. PATENT DOCUMENTS

| 2006/0075001 | A1* | 4/2006 | Canning | G06F 8/65 |
| 2007/0050369 | A1* | 3/2007 | Stiegler | G06F 21/53 |
| 2007/0156695 | A1* | 7/2007 | Lim | G06F 9/468 |
| 2019/0020498 | A1* | 1/2019 | Ye | H04L 12/2829 |

* cited by examiner

*Primary Examiner* — Ayoub Alata

(57) ABSTRACT

A method for facilitating assessment, authorization, and monitoring of policy documents in organizations for cyber security. The method includes a process of receiving indications of policy documents related to an organization from a user, thus, allowing the user to manager cyber security controls of written policy documents in accordance with regulations and standards. The method also includes retrieving regulations from external databases. Further, the method includes analysis of policy documents against regulations and generating insights. Subsequently, the method transmits the generated insights and/or reports to the user. Further, the method includes receiving monitoring data related to the organization from one or more user's PC devices. Further, the method uses a MD5 (Message Digest algorithm 5) hashing function to ensure that a document has not been tampered with and may include a time-based trigger utilizing a standard green/yellow/red light chart for ongoing authorizations and monitoring.

12 Claims, 28 Drawing Sheets

| Control Status | Policy |
|---|---|

- Is the purpose defined;
- Is the scope defined;
- Are roles and Responsibilities clearly defined;
- Is management commitment clearly demonstrated;
- defines personnel or roles to whom the assigned policy is to be disseminated;
- defines personnel or roles to whom the procedures are to be disseminated;
- defines the frequency to review and update the current access control policy;
- reviews and updates the current access control policy with the organization-defined frequency;
- defines the frequency to review and update the current access control procedures;
- reviews and updates the current access control procedures with the organization-defined frequency.
- disseminates the access control policy to organization-defined personnel or roles;
- disseminates the procedures to organization-defined personnel or roles;
- develops and documents procedures to facilitate the implementation of the access control policy and associated access control controls;

FIG. 28

METHOD AND SYSTEM TO FACILITATE ASSESSMENT, AUTHORIZATION, AND MONITORING OF POLICY DOCUMENTS RELATED TO AN ORGANIZATION

The current application claims a priority to the U.S. Provisional Patent application Ser. No. 62/767,617 filed on Nov. 15, 2018.

FIELD OF THE INVENTION

The present invention relates generally to cyber security. More specifically, the present invention relates to a method and system to facilitate assessment, authorization, and monitoring of policy documents for organizations.

BACKGROUND OF THE INVENTION

Currently, auditors and staff are required to walk to each operational division within an organization and locate policy that may or may not exist. In large organizations, this action may be challenging because divisions in large organizations run into problems sharing information. Furthermore, in the risk management framework alone, cybersecurity auditors may be required to review multiple documents that are located throughout the organization. Accordingly, auditing, assessment, authorization, and monitoring of policy documents by existing processes and methods may sometimes take multiple weeks to complete.

Therefore, there is a need for improved methods and systems to facilitate assessment, authorization, and monitoring of policy documents related to an organization that may overcome one or more of the above-mentioned problems and/or limitations. The present invention provides a user to assess, authorize and monitor cybersecurity controls, and written policy in accordance with regulations and standards such as Federal Information System Security Act of 2003, Risk Management Framework (RMF) documented in NIST (National Institute of Standard and Technology) 800-37 and NIST 800-53r4 standards, etc. The method of the present invention can enhance the RMF by using intellectual property to validate and perform monitoring of organizational policy documents in a single platform. Additionally, the method can determine if the organization develops and documents policy that addresses the purpose, scope, roles and responsibilities, management assurance, coordination among organizational units, and compliance of the organization. Further, the method defines a frequency to review and update documentation and may require that each document be digitally signed and that the change page be updated annually.

The method of the present invention can consolidate manual work effort by providing a single point of contact for organizational policy through an automated process. The process of the method can be written logically in a data-flow diagram that may provide a roadmap for a programmer to create the functions needed to design the controls for the organization. Further, the user may be asked a series of questions in relation to applicable audit controls based on one or more selections of the user. The present invention may aid in reducing organizational expenditure and resources by validating written organizational documents that may require to be updated annually and may require a change page along with functional points of contacts in the organization. The method allows users to assess documents upfront during the development of a system related to the organization and may allow re-use of the documents. Further, the method may require digital signatures to be used by users to sign off and validate that a current document may have been validated by an authorized user assigned by a role base access model. The present invention may be hosted on a cloud infrastructure or designated server to ensure that only authorized individuals may gain access to the present invention. Further, the method of the present invention uses a MD5 (Message Digest algorithm 5) hashing function to ensure that a document has not been tampered with and may include a time-based trigger utilizing a standard green/yellow/red light chart for ongoing authorizations and monitoring. As an important process of the present invention, the method also provides a detailed assessment of cyber security controls for compliance against at least one regulation/standard for the organization.

SUMMARY OF THE INVENTION

A method for facilitating assessment, authorization, and monitoring of policy documents is intended to improve many problems and/or limitations of current systems and methods being used in organizations for cyber security. The method of the present invention includes a process of receiving, using a communication device, indication of one or more policy documents related to an organization from a corresponding personal computing (PC) device of a user, thus to allow the user to assess, authorize and monitor cybersecurity controls, and written policy in accordance with regulations and standards such as Federal Information System Security Act of 2003, Risk Management Framework (RMF) documented in NIST (National Institute of Standard and Technology) 800-37 and NIST 800-53r4 standards, etc. The method enhances the RMF by using intellectual property to validate and perform monitoring of organizational policy documents in a single platform. Additionally, the method can determine if the organization develops and documents policy that addresses the purpose, scope, roles and responsibilities, management assurance, coordination among organizational units, and compliance of the organization. Further, the method defines a frequency to review and update documentation and may require that each document be digitally signed and that the change page be updated annually.

The method also includes retrieving, using a remote server, one or more regulations from one or more external databases. Further, the method includes analysis of the plurality of policy documents against the one or more retrieved regulations and generating one or more insights. Subsequently, the method transmits the generated insights and/or reports to the user. Further, the method may include retrieving one or more regulations from one or more external databases and receiving monitoring data related to the organization from one or more user's PC devices.

The method of the present invention can consolidate manual work effort by providing a single point of contact for organizational policy through an automated process. The process of the method can be written logically in a data-flow diagram that may provide a roadmap for a programmer to create the functions needed to design the controls for the organization. Further, the user may be asked a series of questions in relation to applicable audit controls based on one or more selections of the user. The present invention may aid in reducing organizational expenditure and resources by validating written organizational documents that may require to be updated annually and may require a change page along with functional points of contacts in the organization. The method allows users to assess documents upfront during the development of a system related to the organization and may allow re-use of the documents. Further, the method may require digital signatures to be used by users to sign off and validate that a current document may have been validated by an authorized user assigned by a role base access model. The present invention may be hosted on a cloud infrastructure or designated server to ensure that only authorized individuals may gain access to the present invention. Further, the method of the present invention uses a MD5 (Message Digest algorithm 5) hashing function to ensure that a document has not been tampered with and may include a time-based trigger utilizing a standard green/yellow/red light chart for ongoing authorizations and monitoring.

BRIEF DESCRIPTION OF THE DRAWINGS

FIG. 28 is an illustration of an exemplary list of requirements for the assessment of cyber security controls of the method of the present invention.

DETAIL DESCRIPTIONS OF THE INVENTION

Figure 1:
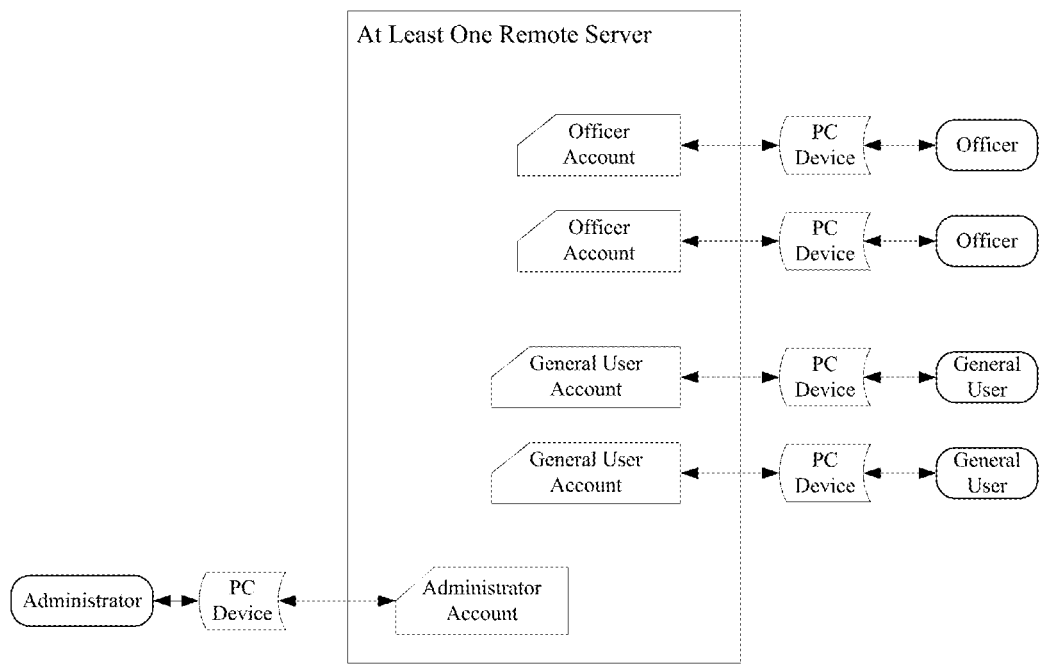
FIG. 1 is a system diagram of the method of the present invention.

All illustrations of the drawings are for the purpose of describing selected versions of the present invention and are not intended to limit the scope of the present invention.

As can be seen in FIG. 1 to FIG. 28, the present invention is a method to facilitate assessment, authorization, and monitoring of organization policy documents. In the preferred embodiment of the present invention, the method, also called as "Watcher", is a policy, integrity, and monitoring consolidation system that is designed to solve multiple problems related to cybersecurity field of organizations. The Watcher method may be used to assess, authorize and monitor cybersecurity controls, and written policy in accordance with one or more regulations and/or standards including, but not limited to, Federal Information System Security Act of 2003, Risk Management Framework (RMF) documented in NIST (National Institute of Standard and Technology) 800-37 and NIST 800-53r4 standards, etc. The Watcher method may enhance the RMF by using intellectual property to validate and perform monitoring of organizational policy documents in a single platform. Further, the Watcher method may provide a monitoring function using a standard green/yellow/red light chart, as shown in FIG. 17.

The Watcher method may support a plurality of steps in the Risk Management Framework, including, but not limited to assess, authorize, and monitor. Further, the Watcher method may assess documents by validating that written policy has the proper language in the documents by one or more regulations, such as NIST 800-53a control baseline. Further, the Watcher method may support a plurality of policy controls, including, but not limited to, Contingency Planning Policy and Procedures (CP-1), Access Control Policy and Procedures (AC-1), Configuration Management Policy and Procedures (CA-1), and so on.

The Watcher method may determine if the organization develops and documents policy that addresses the purpose, scope, roles and responsibilities, management assurance, coordination among organizational units, and compliance of the organization. Further, the Watcher method may determine if the organization develops and documents policy that defines personnel or roles to whom the assigned policy is to be distributed, tracks that the policy was distributed to proper stakeholders in the organization and associated controls, and so on. Further, the Watcher method may define a frequency to review and update documentation and may require that each document needs to be digitally signed and that the change page be updated annually. Further, the Watcher method may track when policy control procedures are being reviewed or updated and may determine a status of each check by predefined roles that may be assigned for each user (such as system administrator) related to the organization, such as a Certifying Official (CO), Organizational Policy Compliance Manager (OPCM), a Policy Compliance Officer (PCO), and so on.

The Watcher method may consolidate manual work effort by providing a single point of contact for organizational policy through an automated process. The OPCM of the organization may be a licensed and approved person to use the Watcher method to ensure that organizational documentation is being managed effectively. Further, in an embodiment, the Watcher method may include an enhanced method to create a new process to automate, consolidate, and monitor documentation through specifically designed software. The steps of the method may be written logically in a data-flow diagram that may provide a roadmap for a programmer to create the functions needed to design the Watcher method for the organization. For instance, the user may select a predefined list of document names such as configuration management policy. Further, the user may be asked a series of questions in relation to applicable audit controls based on one or more selections of the user. Accordingly, a new line item may be created in the Watcher method and may provide a current status (custom code option) of the assigned document. Custom code may process several functions that may generate results based on answers provided by the user. The results may be displayed in a user interface of the Watcher method.

Further, the Watcher method may aid in reducing organizational expenditure and resources by validating written organizational documents, including, but not limited to policy, body of evidence, technical standard operating procedures, system design documentation, and other technical documents that may require to be updated annually and may require a change page along with functional points of contacts in the organization. Further, the Watcher method may allow users (such as system administrators related to the organization) to assess documents upfront during the development of a system related to the organization and may allow re-use of the documents. Further, the Watcher method may also annotate systems in association with documents. Further, the Watcher method may require digital signatures to be used by users to sign off and validate that a current document may have been validated by an authorized user assigned by a role base access model. Further, the Watcher method may be hosted on a cloud infrastructure or designated server to ensure that only authorized individuals may gain access to the Watcher method. Further, the Watcher method creates a new functional role and job in organizations for auditors to use as a focus point and point of contact for validating written documents in an organizational structure.

Figure 2:
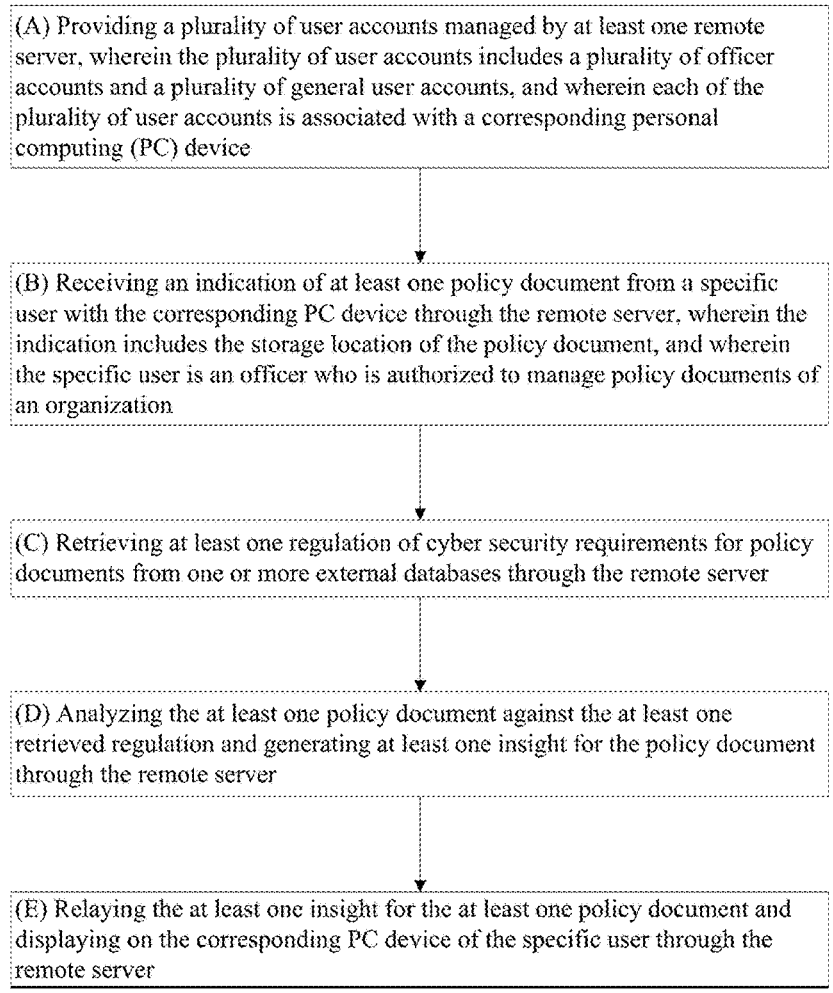
FIG. 2 is an overall flowchart of a method to facilitate assessment of policy documents of the present invention.

As can be seen in FIG. 1, the Watcher method of the present invention provides an organization policy document management platform between multiple users. To accomplish this, the method of the present invention associates each of the plurality of users with a unique user account from a plurality of user accounts that is managed by at least one remote server (Step A) as seen in FIG. 2, wherein the plurality of user accounts includes a plurality of officer accounts and a plurality of general user accounts, and wherein each of the plurality of user accounts is associated with a corresponding personal computing (PC) device. The corresponding user PC device allows a user to interact with the present invention and can be, but is not limited to, a smartphone, a smart watch, a laptop, a desktop, a server computer, or a tablet PC. The users of the user accounts include, but are not limited to, relevant parties such as, but are not limited to, a plurality of officers and a plurality of general users. The plurality of general users may include, but is not limited to, individuals, employees, secretaries, clerks, staff, contractors, information technology (IT) professionals, system designers, supervisors, managers, officers, executives, engineers, specialists, consultants, corporations, government entities, administrators, etc. The plurality of officers may include, but is not limited to, policy document officers, document control officers, document control managers, auditors, assessors, information technology (IT) professionals, software engineers, system designers, supervisors, managers, control managers, policy control managers, officers, Information System Security Officer (ISSO), Information System Security Manager (ISSM), Organizational Policy Control Manager (OPCM), and the Policy Control Officer (PCO)executives, engineers, specialists, consultants, corporations, government entities, administrators, etc. Further, the at least one remote server is used to manage method between the plurality of user accounts. The remote server can be managed through an administrator account by an administrator as seen in FIG. 1. Moreover, the remote server is used to execute a number of internal software processes and store data for the present invention. The software processes may include, but are not limited to, server software programs, cloud software programs, web-based software applications or browsers embodied as, for example, but not be limited to, websites, web applications, cloud applications, desktop applications, and mobile applications compatible with a corresponding user PC device. Additionally, the software processes may store data into internal databases and communicate with external databases, which may include, but are not limited to, document databases, regulation and standard databases, databases maintaining user information, databases maintaining user secured signature files, databases maintaining sensory information/data, etc. The interaction with external databases over a communication network may include, but is not limited to, the Internet.

As can be seen in FIG. 2, the Watcher method used to facilitate the assessment, authorization, and monitoring of organization policy documents of the present invention receives an indication of at least one policy document from a specific user with the corresponding PC device through the remote server, wherein the indication includes the storage location of the policy document, and wherein the specific user is an officer who is authorized to manage policy documents of an organization (Step B). Specifically, the Watcher method may include a step of receiving, using a communication device, indication of at least one policy document related to an organization from an administrator device. The policy document may include at least one document that may be maintained by the organization to describe one or more aspects of the operation of the organization. Further, policy documents may include at least one document required to be maintained by the organization in keeping with at least one regulation. These documents include, but are not limited to, company policy, body of evidence, technical standard operating procedures, system design documentation, and any other technical documents. For instance, policy documents may include, but are not limited to, contingency planning policy and procedures, access control policy and procedures, configuration management policy and procedures, configuration management policy and procedures, configuration management plan, identification and authentication policy and procedures, and so on. Further, the indication of at least one policy document may include details of one or more locations and/or storage paths where the at least one policy document may be stored. In an embodiment of the present invention, the indication of the at least one policy document may be received through an input mechanism of an administrator PC device such as, for example, a desktop computer, laptop computer, a tablet computer, and a mobile device. Further, the administrator PC device may be configured to communicate with the communication device of a server computer. Accordingly, in an embodiment of the present invention, the indication of the at least one policy document ma be entered through the input mechanism and transmitted from the administrator PC device to the remote server. In some embodiments, the indication of the at least one policy document may be automatically retrieved from the administrator PC device and/or transmitted to the remote server.

As can be seen in FIG. 2, the Watcher method subsequently retrieves at least one regulation of cyber security requirements for policy documents from one or more databases through the remote server (Step C). Specifically, the Watcher method may include retrieving, through the remote server, at least one regulation from one or more databases. The at least one regulation may relate to security controls for information systems and organizations and may describe a set of standards that one or more organizations may need to follow to secure classified information present within the organization. Accordingly, based on the set of standards followed by the organization, the regulations may relate to, and describe at least one document, along with an acceptable format, language, content, and so on, that the organization may need to maintain. For instance, the at least one regulation may relate to Federal Information System Security Act of 2003 and Risk Management Framework (RMF) documented in NIST 800-37 and NIST 800-53r4 standards. Accordingly, the at least one regulation may be retrieved from one or more internal and/or external databases such as databases including one or more publications listing the at least one regulation.

As can be seen in FIG. 2, the Watcher method analyzes the at least one policy document against the at least one retrieved regulation and generates at least one insight for the policy document through the remote server (Step D). Specifically, the Watcher method may include analyzing, through the remote server, the at least one policy document against the at least one retrieved regulation and then generates at least one insight. In one embodiment, the analysis may include inspecting a metadata associated with the at least one policy document, including, but not limited to, a creation date of the at least one policy document, a last edited date associated with the at least one policy document, and one or more classification tags associated with at least one policy document. Further, in another embodiment, the analysis may include evaluating a content of the at least one policy document, such as through NLP (Natural Language Processing). Further, the analysis may include determining whether the at least one policy document conforms to the at least one regulation or may be compliant. Accordingly, at least one insight may be generated based on the analysis. The at least one insight may include a description of the at least one policy document, and whether the at least one policy document may be compliant with the at least one regulation. For instance, a document of the at least one policy document may be determined to be compliant, or noncompliant with a regulation based on an update history of the document. Further, the at least one insight may describe whether the document may be complete, and whether the organization may be maintaining all documents as required by the at least one regulation.

As can be seen in FIG. 2, the Watcher method relays the at least one insight for the at least one policy document and displaying on the corresponding PC device of the specific user through the remote server (Step E). Specifically, the Watcher may include transmitting, through the remote server, the generated insights to the administrator PC device. The at least one generated insight may be transmitted to the remote server and or the administrator PC device, whereupon, the insights may be viewable by one or more administrators.

Figure 3:
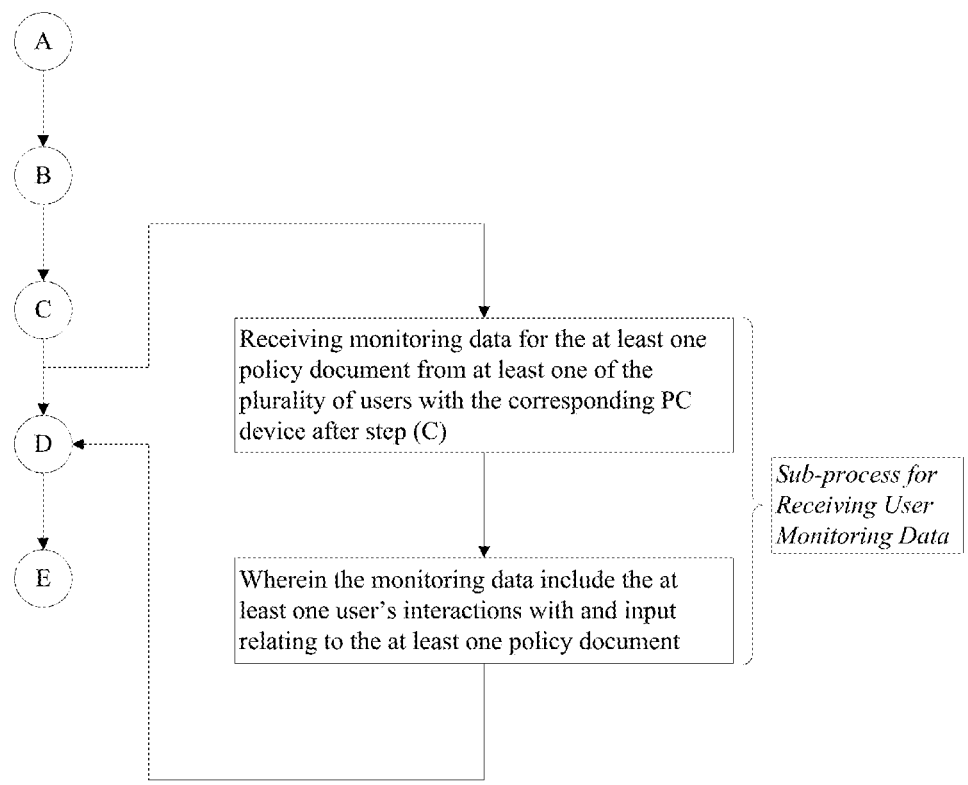
FIG. 3 is a flowchart of a sub-process of receiving user's monitoring data of the method of the present invention.
Figure 4:
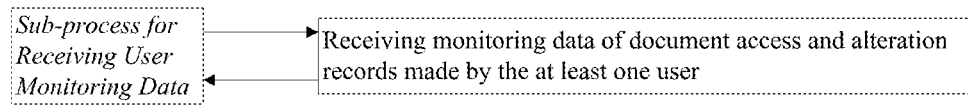
FIG. 4 is a flowchart of an embodiment of the sub-process of receiving user's monitoring data of the method of the present invention.
Figure 5:
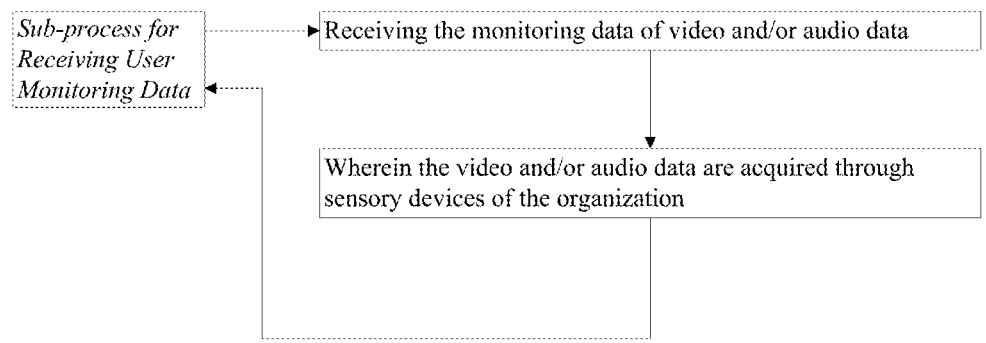
FIG. 5 is a flowchart of another embodiment of the sub-process of receiving user's monitoring data of the method of the present invention.
Figure 6:
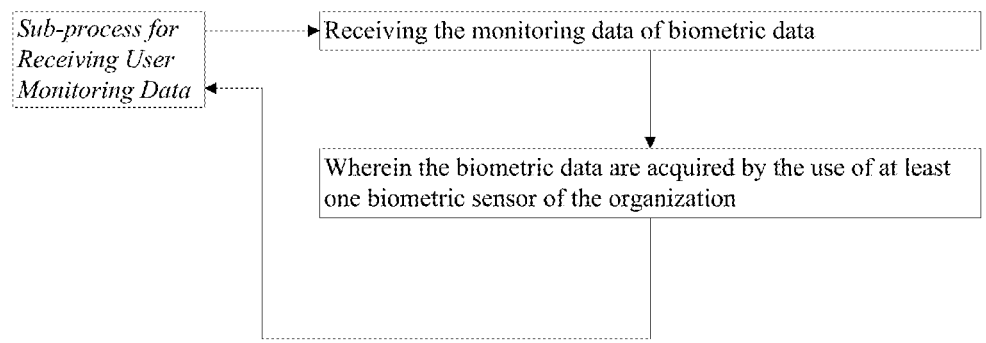
FIG. 6 is a flowchart of another embodiment of the sub-process of receiving user's monitoring data of the method of the present invention.

As can be seen in FIG. 3, in an embodiment of the present invention, the Watcher method of the present invention provides a sub-process to receive monitoring data of a specific user. The embodiment of the Watcher method receives monitoring data for the at least one policy document from at least one of the plurality of users with the corresponding PC device after Step C, wherein the monitoring data include the at least one user's interactions with and input relating to the at least one policy document. More specifically, the sub-process of the Watcher method may include receiving, through the remote server, monitoring data related to the organization from the corresponding PC device of the specific user. The monitoring data related to the organization, received from the specific user may include interaction of the specific user with at least one policy document of the organization and/or with one or more system components of the organization. As can be seen in FIG. 4, the Watcher method may receive monitoring data of document access and alteration records made by the at least one user. Further, the may include one or more sensors in the organization. The one or more sensors may include monitoring devices, such as but not limited to one or more CCTV (Closed Circuit TV) and IP (Internet Protocol) cameras, biometric sensors, and so on. Accordingly, monitoring data related to the organization, received from the one or more sensory devices may include one or more images, videos, and so on of the organization. As can be seen in FIG. 5, the sub-process for receiving user monitoring data may receive the monitoring data of video and/or audio data, wherein the video and/or audio data are acquired through sensory devices of the organization. As can be seen in FIG. 6, the sub-process for receiving user monitoring data may receive the monitoring data of biometric data, wherein the biometric data are acquired by the use of at least one biometric sensor of the organization. Further, the method may include analyzing, using a processing device, the at least one policy document against the monitoring data on the basis of the one or more retrieved regulations and generating one or more insights. In an embodiment, the analyzing may include inspecting a metadata associated with at least one policy document, including, but not limited to a creation date of the at least one policy document, a last edited date associated with the at least one policy document, and one or more classification tags associated with the at least one policy document. Further, in an instance, the analysis may include evaluating a content of the at least one policy document, such as through NLP. Further, the analysis may include determining whether the at least one policy document may conform to the one or more regulations or may be compliant. Further, the analysis may include comparing the plurality of policy documents against the monitoring data. For instance, the monitoring data may be analyzed to determine one or more discrepancies as determined from at least one policy document. For instance, a discrepancy may be detected based on the monitoring data if one or more users are determined to be altering, or even at least one policy document that the one or more users may be unauthorized to access. Further, for instance, a discrepancy may be detected based on the monitoring data if one or more users are determined to be accessing one or more areas in the organization that the one or more users may be unauthorized to be accessing, as described in at least one policy document on the basis of one or more regulations. Accordingly, one or more insights may be generated based on the analysis. The one or more insights may include a description of the monitoring data, and whether one or more, if any, discrepancies are found in the monitoring data on as described in at least one policy document on the basis of one or more regulations.

Figure 7:
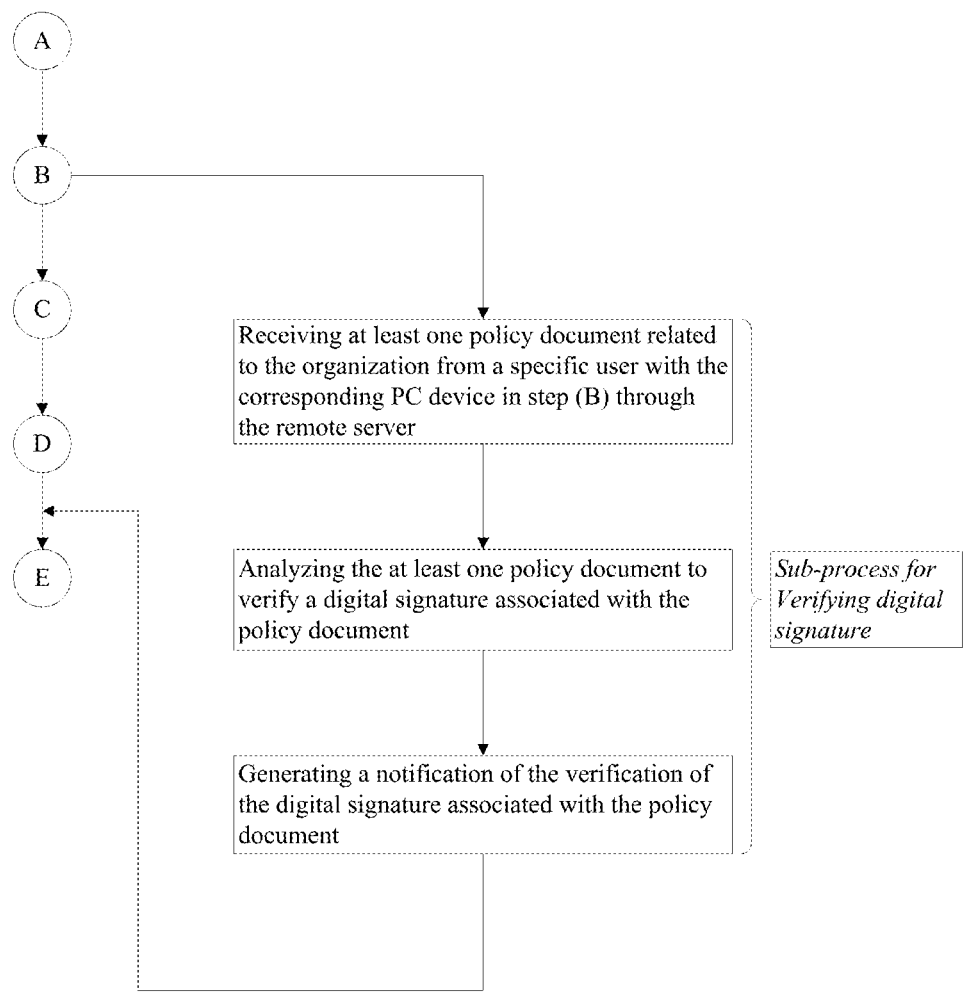
FIG. 7 is a flowchart of a sub-process of verifying digital signatures of the method of the present invention.
Figure 8:
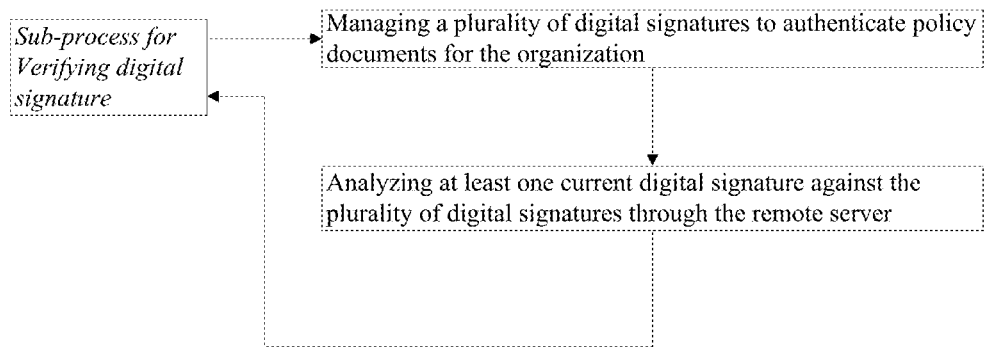
FIG. 8 is a flowchart of an embodiment of the sub-process of verifying digital signatures of the method of the present invention.

As can be seen in FIG. 7, in an embodiment of the present invention, the Watcher method of the present invention provides a sub-process to verify the digital signature of at least one user. The embodiment of the Watcher method receives at least one policy document related to the organization from a specific user with the corresponding PC device in Step B through the remote server, analyzes the at least one policy document to verify a digital signature associated with the policy document, and generates a notification of the verification of the digital signature associated with the policy document. The Watcher method includes a designated approving authority function, which may provide a digital signature to validate individual sites and controls to streamline authorizations for cyber security requirements and audits in the organization that may require policy validation. Accordingly, all written documents in an organization may be healthy, valid, and may be included under one consolidated the Watcher method. The Watcher method may use predefined language that standardizes compliance issues regarding status of each associated document. The predefined language may be tailored to NIST 800-53a controls. The Watcher method may provide metrics reporting to one or more officers/administrators, such as senior management of the organization, and may be deployable in any location in which the organization may operate. The Watcher method may create new functional roles in organizations that may require auditing of soft copy or written documents in standard formats. Further, the method may include analyzing, through the remote server, the policy document to verify a digital signature associated with the policy document. The analysis may include determining whether the policy document may include a digital signature corresponding to a plurality of digital signatures associated with the organization to determine the authenticity of the policy document. For instance, the document may be determined to be authentic if all of a plurality of digital signatures associated with the policy documents correspond to the plurality of digital signatures associated with the organization. As can be seen in FIG. 8, the digital signature verification sub-process manages a plurality of digital signatures to authenticate policy documents for the organization, and analyzes at least one current digital signature against the plurality of digital signatures through the remote server. Further, the analysis may include a comparison of a metadata associated with the policy document with one or more digital signatures included in the document. The metadata associated with the policy document may be analyzed to determine one or more instances when the policy document may have been altered, modified, or updated. Further, one or more digital signatures corresponding to the one or more when the policy document may have been altered, modified, or updated may be authenticated. In an embodiment of the present invention, the authentication, verification, or validation of the one or more digital signatures may be performed using one or more techniques known in the art. Accordingly, one or more digital signatures associated with the policy document may be verified. Further, the method may include a step of transmitting, through the remote server, a notification of the verification of the digital signature associated with the policy document in Step E.

Figure 9:
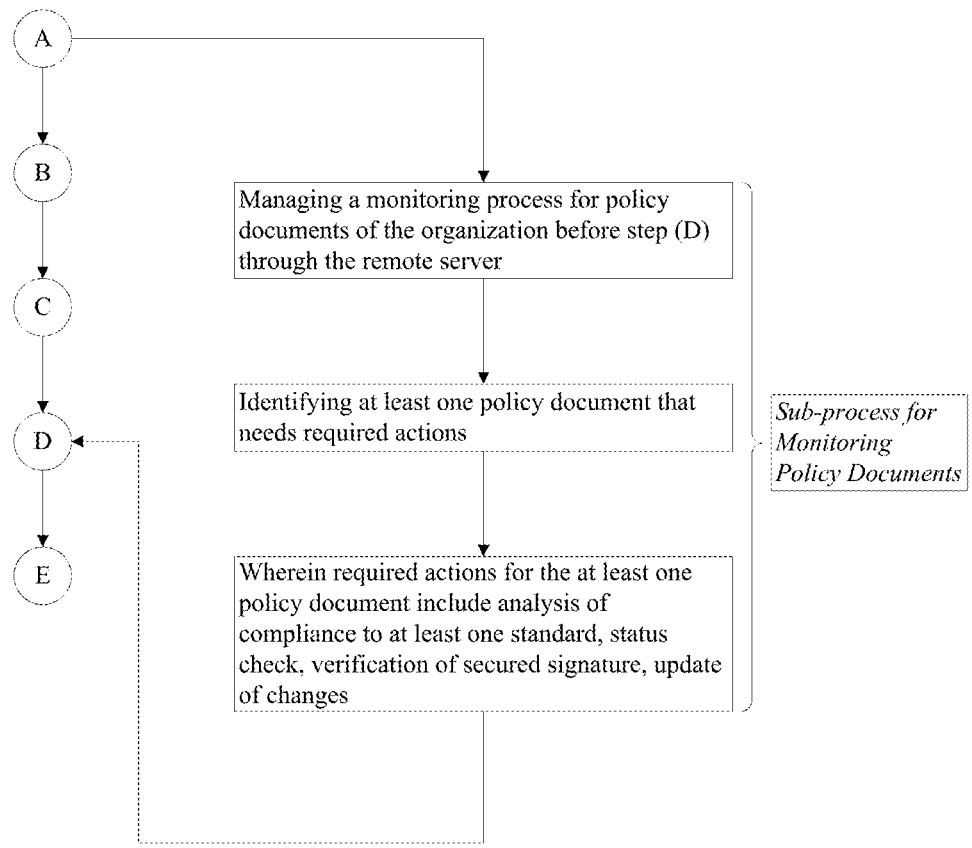
FIG. 9 is a flowchart of a sub-process of monitoring policy documents of the method of the present invention.
Figure 10:
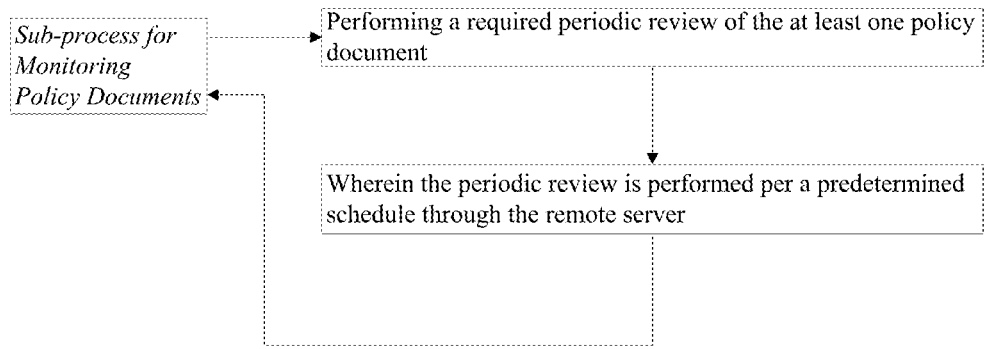
FIG. 10 is a flowchart of an embodiment of the sub-process of monitoring policy documents of the method of the present invention.
Figure 11:
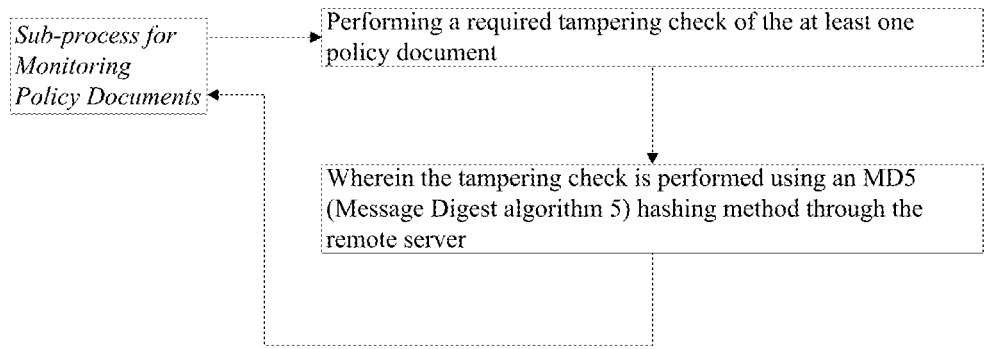
FIG. 11 is a flowchart of another embodiment of the sub-process of monitoring policy documents of the method of the present invention.
Figure 12:
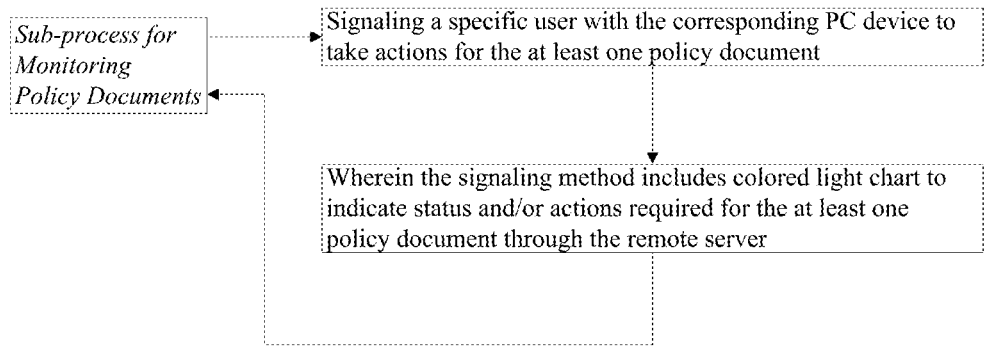
FIG. 12 is a flowchart of another embodiment of the sub-process of monitoring policy documents of the method of the present invention.

As can be seen in FIG. 9, in an embodiment of the present invention, the Watcher method of the present invention provides a sub-process to monitor policy documents. The sub-process of the Watcher method manages a monitoring process for policy documents of the organization before Step D through the remote server. Then the Watcher method identifies at least one policy document that needs required actions, wherein required actions for the at least one policy document include analysis of compliance to at least one standard, status check, verification of secured signature, update of changes. As can be seen in FIG. 10, the monitoring sub-process of the Watcher method may perform a required periodic review of the at least one policy document, wherein a required periodic review of the at least one policy document. As can be seen in FIG. 11, the monitoring sub-process of the Watcher method may perform a required tampering check of the at least one policy document, wherein a required tampering check of the at least one policy document, wherein the tampering check is performed using an MD5 (Message Digest algorithm 5) hashing method through the remote server. The Watcher method may use the MD5 hashing function to ensure that a document has not been tampered with and may include a time-based trigger utilizing a standard green/yellow/red light chart for ongoing authorizations and monitoring. As can be seen in FIG. 12, the monitoring sub-process of the Watcher method may signal a specific user with the corresponding PC device to take actions for the at least one policy document, wherein the signaling method includes colored light chart to indicate status and/or actions required for the at least one policy document through the remote server. The Watcher method may use a time stamp function that creates a flag when an event is triggered on a single line item for an assigned document. In an embodiment of the present invention, the Watcher method may use a standard green/yellow/red light chart for the signaling method. The standard green/yellow/red light chart indicates that 1.) the at least one policy documents is in compliant using a green light tag/button, 2.) at least one policy documents is not in compliant using a red light tag/button, 3.) at least one policy documents is required for actions and sign-off for compliance within 30 days using a yellow light tag/button, and 4.) at least one policy documents is required for actions and sign-off for compliance within 60 days using a yellow light tag/button. For example, when the clock hits 30 days, an annual review button and the change page function button will turn yellow for a specific policy document until the annual review is completed. An email will also be generated and sent to the assigned Information System Security Officer (ISSO), Information System Security Manager (ISSM), Organizational Policy Control Manager (OPCM), and the Policy Control Officer (PCO) to ensure that required action is taken. For the flagged item, the Watcher method will generate an executive summary report, Security Assessment Report; a Plan of Action and Milestones Report that can be used as a roadmap to make the process of ensuring that the at least one policy document is compliant with industry and government auditing standards.

Figure 13:
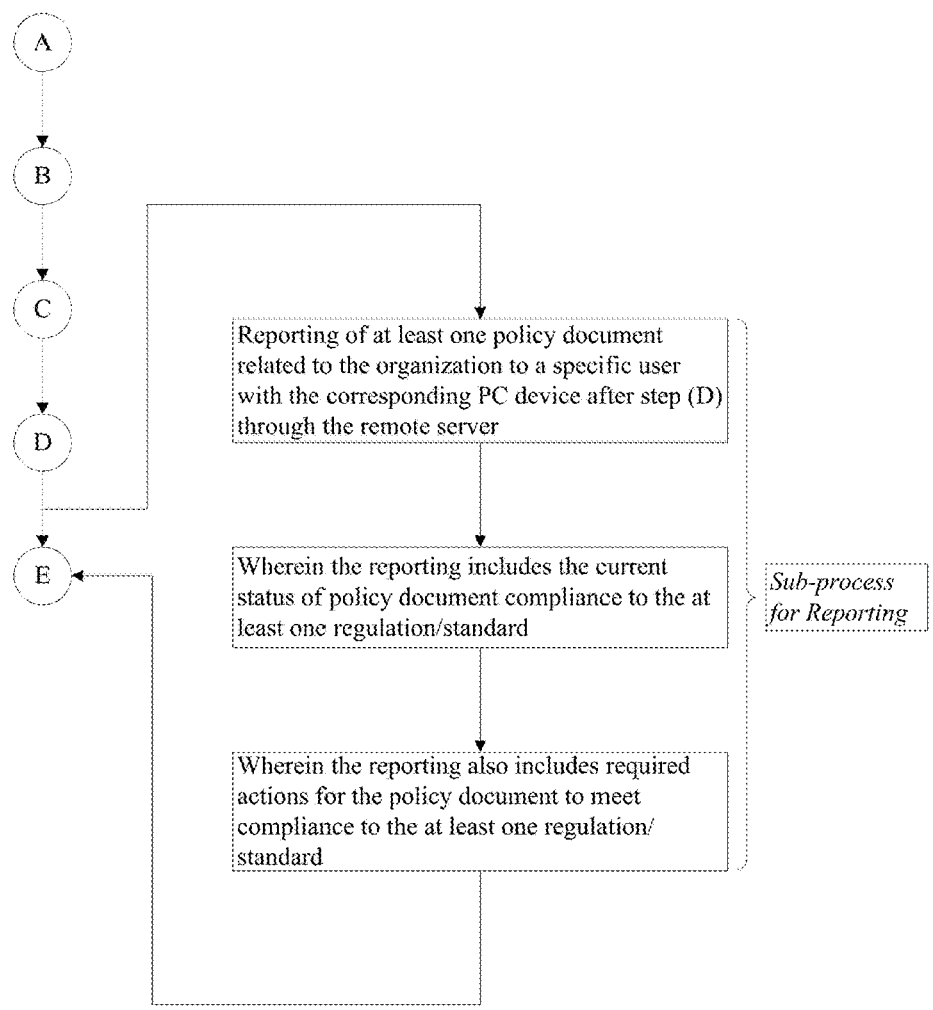
FIG. 13 is a flowchart of a sub-process of reporting of the method of the present invention.
Figure 14:
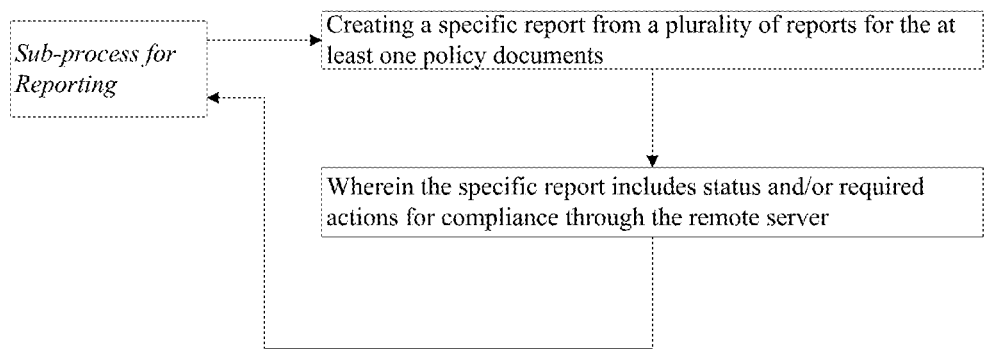
FIG. 14 is a flowchart of an embodiment of the sub-process of reporting of the method of the present invention.
Figure 15:
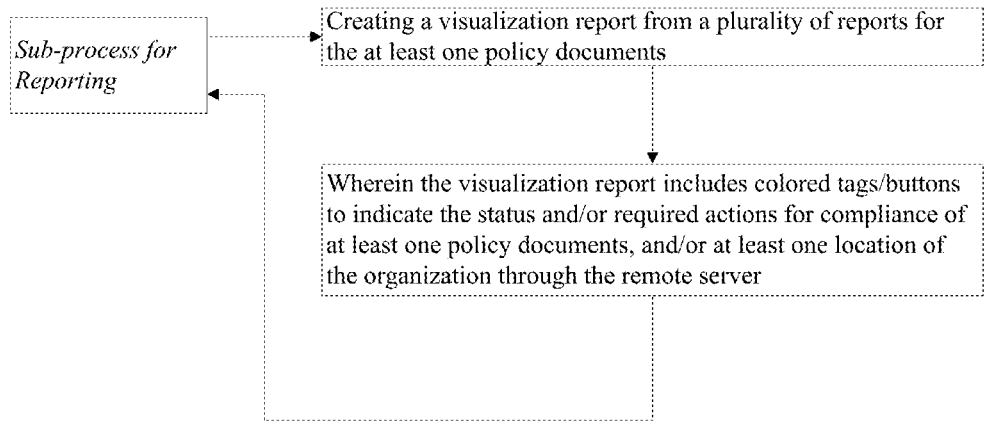
FIG. 15 is a flowchart of another embodiment of the sub-process of reporting of the method of the present invention.
Figure 21:
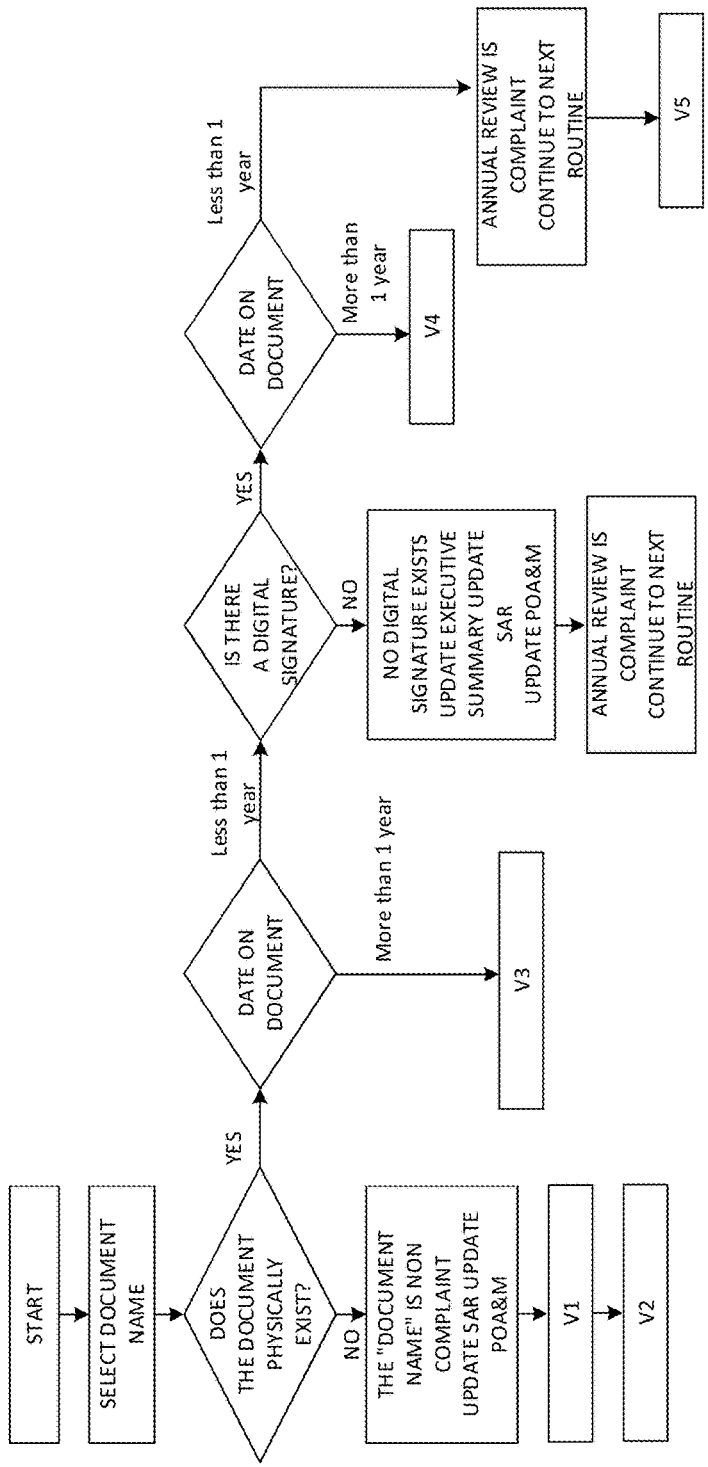
FIG. 21 is an illustration of an exemplary logical flowchart to facilitate assessment, authorization, and monitoring of policy documents particular to an organization, in accordance with the method of the present invention.
Figure 22:
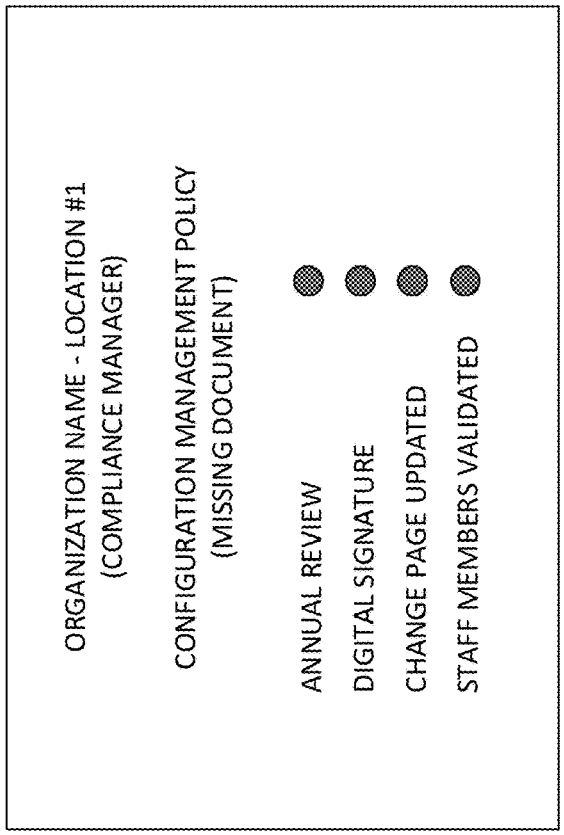
FIG. 22 is an illustration of an exemplary visualization to be displayed if a document name is determined to be noncompliant of the method of the present invention.
Figure 23:
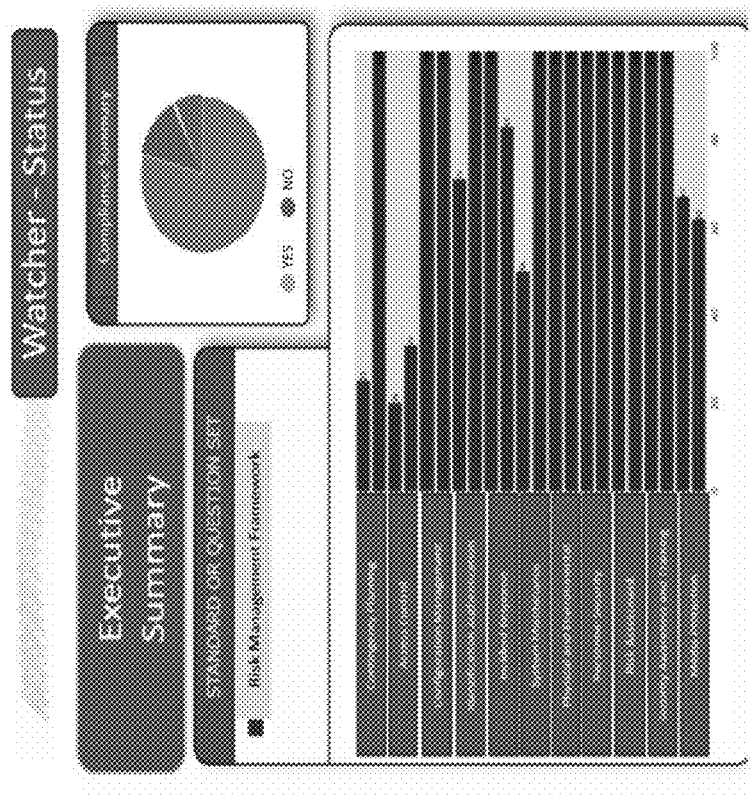
FIG. 23 is an illustration of an executive summary report created by the method of the present invention.
Figure 24:
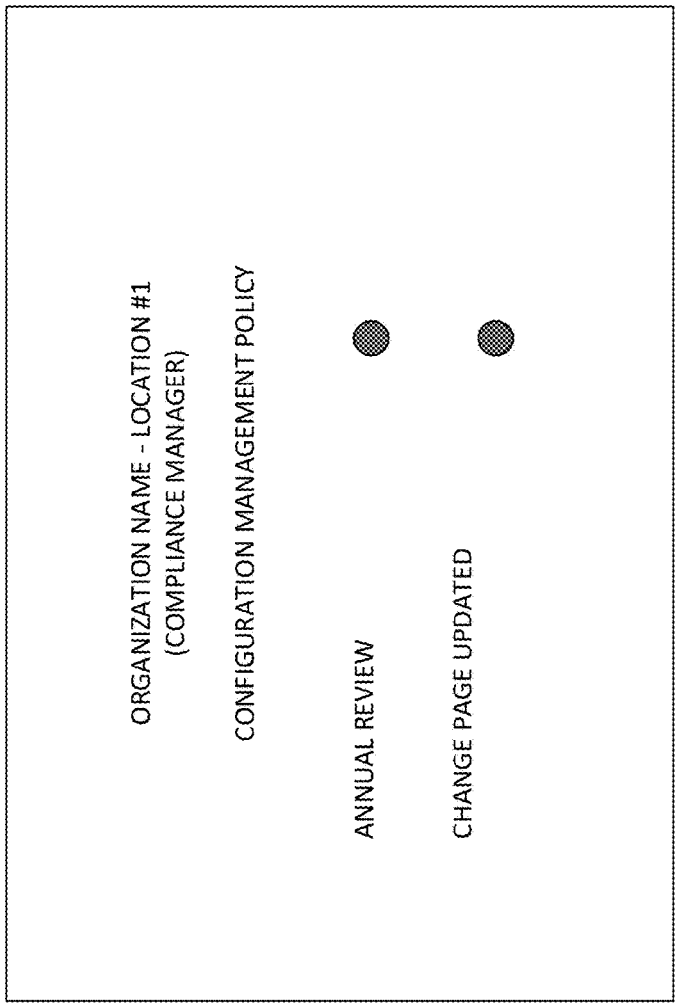
FIG. 24 is an illustration of another exemplary visualization to be displayed if a document name is determined to be noncompliant of the method of the present invention.
Figure 25:
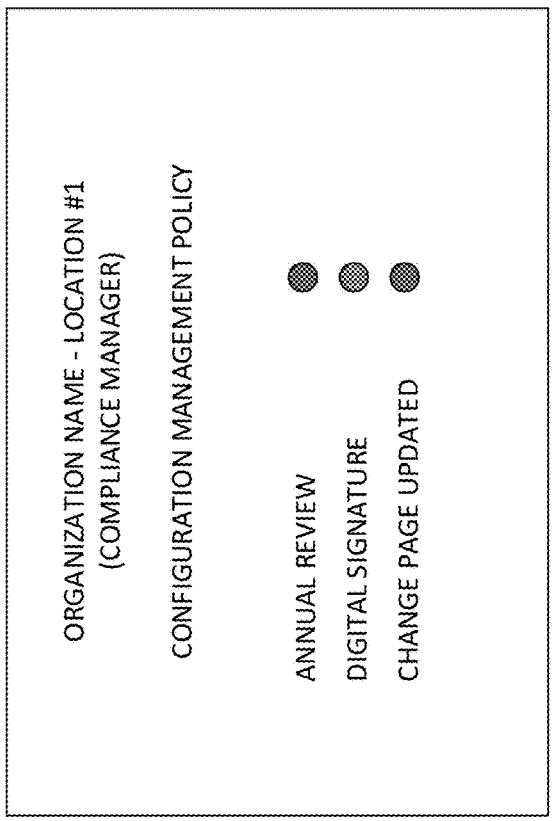
FIG. 25 is an illustration of another exemplary visualization to be displayed if a document name is determined to be noncompliant of the method of the present invention.
Figure 26:
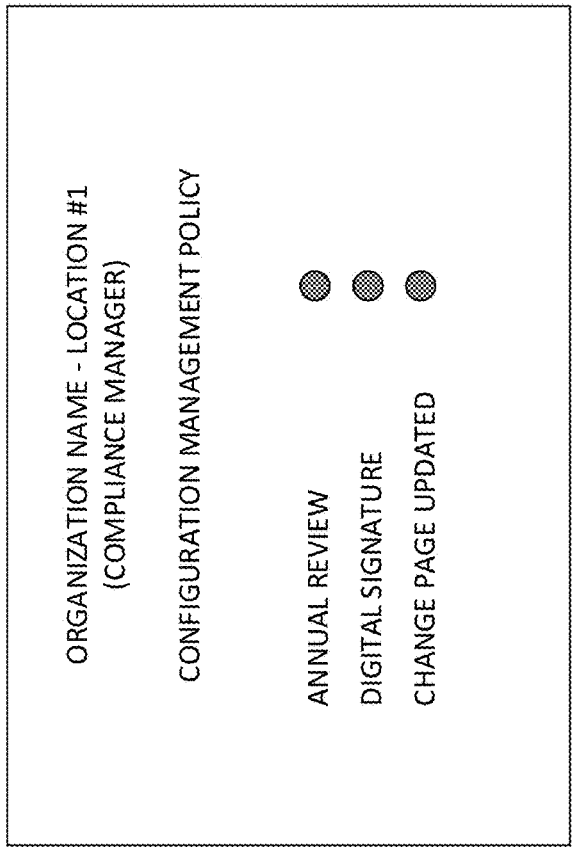
FIG. 26 is an illustration of an exemplary visualization to be displayed if a document name is determined to be compliant of the method of the present invention.

As can be seen in FIG. 13, the Watcher method provides a sub-process for reporting, which may report of at least one policy document related to the organization to a specific user with the corresponding PC device after Step D through the remote server, wherein the reporting includes the current status of policy document compliance to the at least one regulation/standard, and wherein the reporting also includes required actions for the policy document to meet compliance to the at least one regulation/standard. As can be seen in FIG. 14, the reporting sub-process of the Watcher method may create a specific report from a plurality of reports for the at least one policy documents, wherein the specific report includes status and/or required actions for compliance through the remote server. The plurality of reports may include, but is not limited to, an executive summary report, Security Assessment Report; a Plan of Action and Milestones Report. As can be seen in FIG. 15, the reporting sub-process of the Watcher method may create a visualization report from a plurality of reports for the at least one policy documents, wherein a visualization report from a plurality of reports for the at least one policy documents. The Watcher method may create several automated reports based on the information provided for each question with predefined problem statements. The reports may consist of an executive summary, security assessment report, FISMA (The Federal Information Security Management Act) assessment of controls report, plan of actions, and milestones. The report may be generated by predefined user roles and on a need-to-know basis through PKI (Public Key Infrastructure) authentication. As can be seen in FIG. 21, a document name may be selected. If the document does not exist, the document name may be determined to be noncompliant, and a visualization describing the same may be displayed. As can be seen in FIG. 22, a visualization is displayed if a document name is determined to be noncompliant. Further, as can be seen in FIG. 22, a different visualization may be displayed if a document name is determined to be noncompliant. Further, if the document exists, the document may be inspected for a date. If the date is found to be more than one year, the document name may be determined to be noncompliant, and a visualization, as seen in FIG. 24 may be displayed. Further, if the date is found to be more than one year, the document may be inspected for a digital signature. If a digital signature does not exist, executive summary as seen in FIG. 23, SAR (suspicious activity report), and POA&M (Plan of Actions & Milestones) may be updated. Further, if a digital signature exists, the document may be inspected for a date. If the date is found to be more than one year, the document name may be determined to be noncompliant, and a visualization, as seen in FIG. 25 may be displayed. Further, if the date is found to be less than one year, the document name may be determined to be compliant, and another visualization, as seen in FIG. 26 may be displayed.

Figure 18:
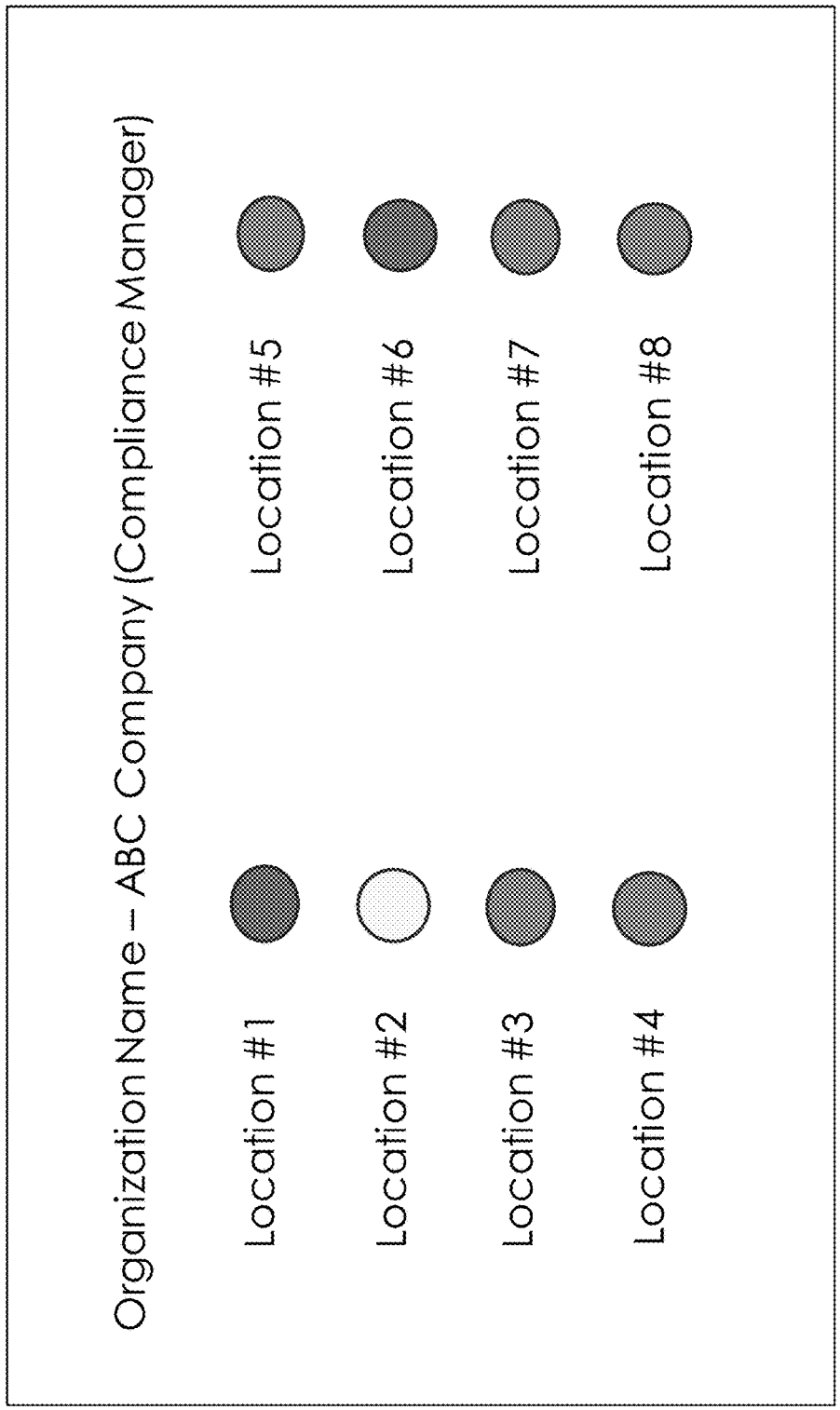
FIG. 18 is an illustration of multiple monitored locations of an organization using a standard green/yellow/red light chart of the method of the present invention.
Figure 19:
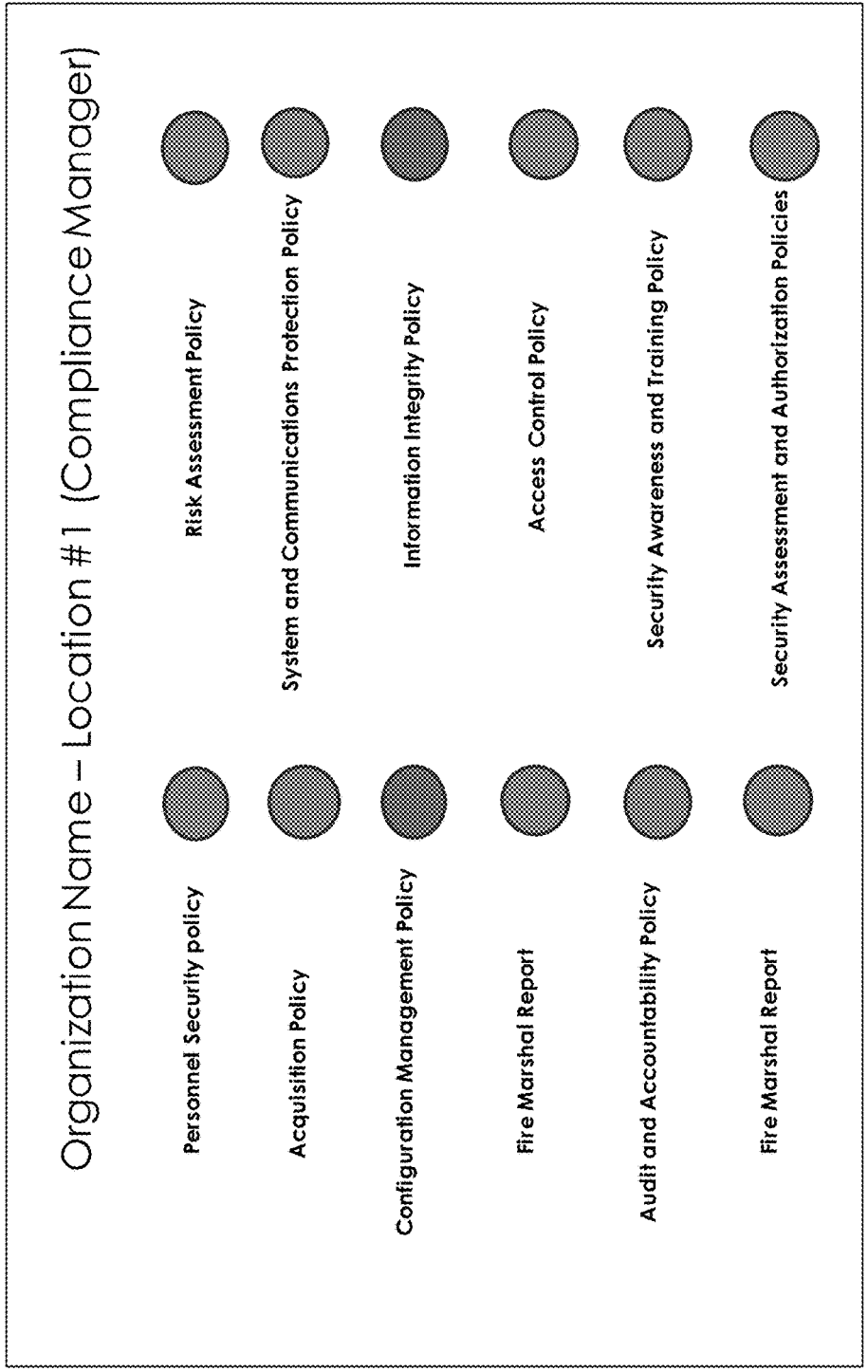
FIG. 19 is an illustration of multiple monitored policy categories particular to individual locations of the organization using a standard green/yellow/red light chart of the method of the present invention.
Figure 20:
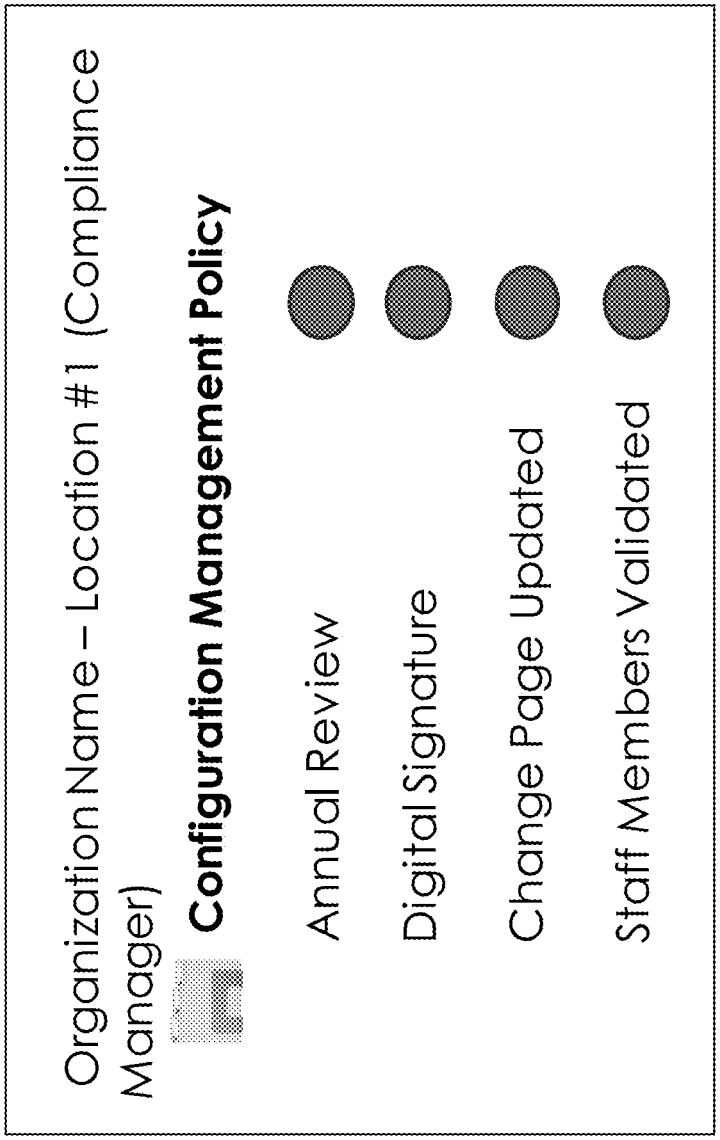
FIG. 20 is an illustration of multiple monitored policies related to an individual category particular to the individual location of the organization using a standard green/yellow/red light chart of the method of the present invention.

As can be seen in FIG. 18, the Watcher method may display multiple monitored locations and their corresponding compliance status of an organization using a standard green/yellow/red light chart. As can be seen in FIG. 19, the Watcher method may display multiple monitored policy categories particular to individual locations and their corresponding compliance status of the organization using a standard green/yellow/red light chart. As can be seen in FIG. 20, the Watcher method may display multiple monitored policies related to an individual category particular to the individual location of the organization using a standard green/yellow/red light chart.

Figure 16:
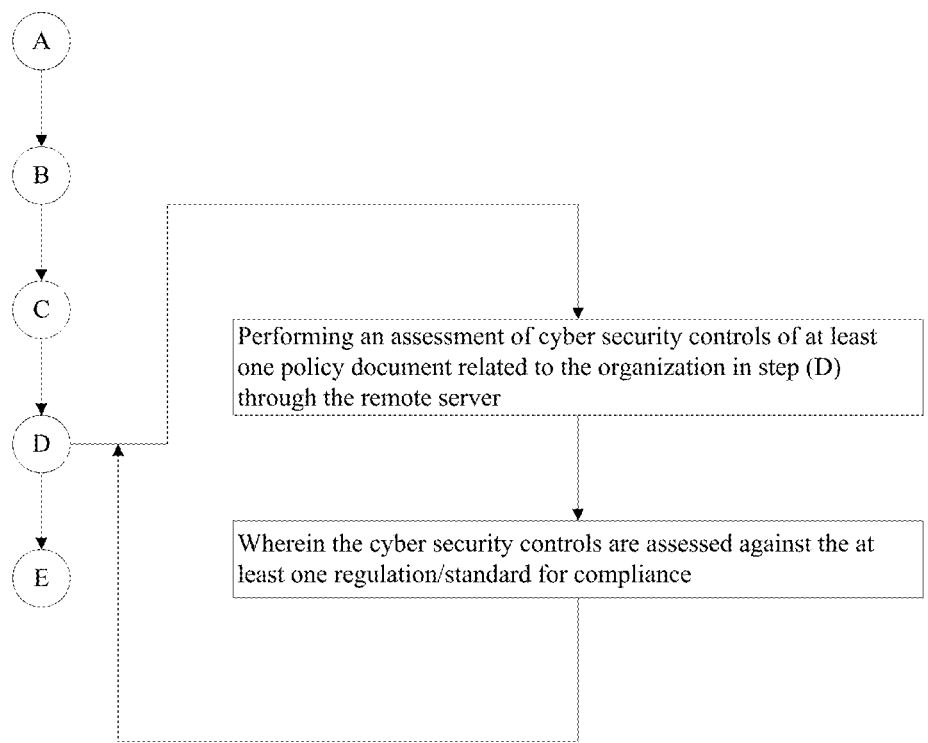
FIG. 16 is a flowchart of a sub-process of performing an assessment of cyber security controls by the method of the present invention.
Figure 17:
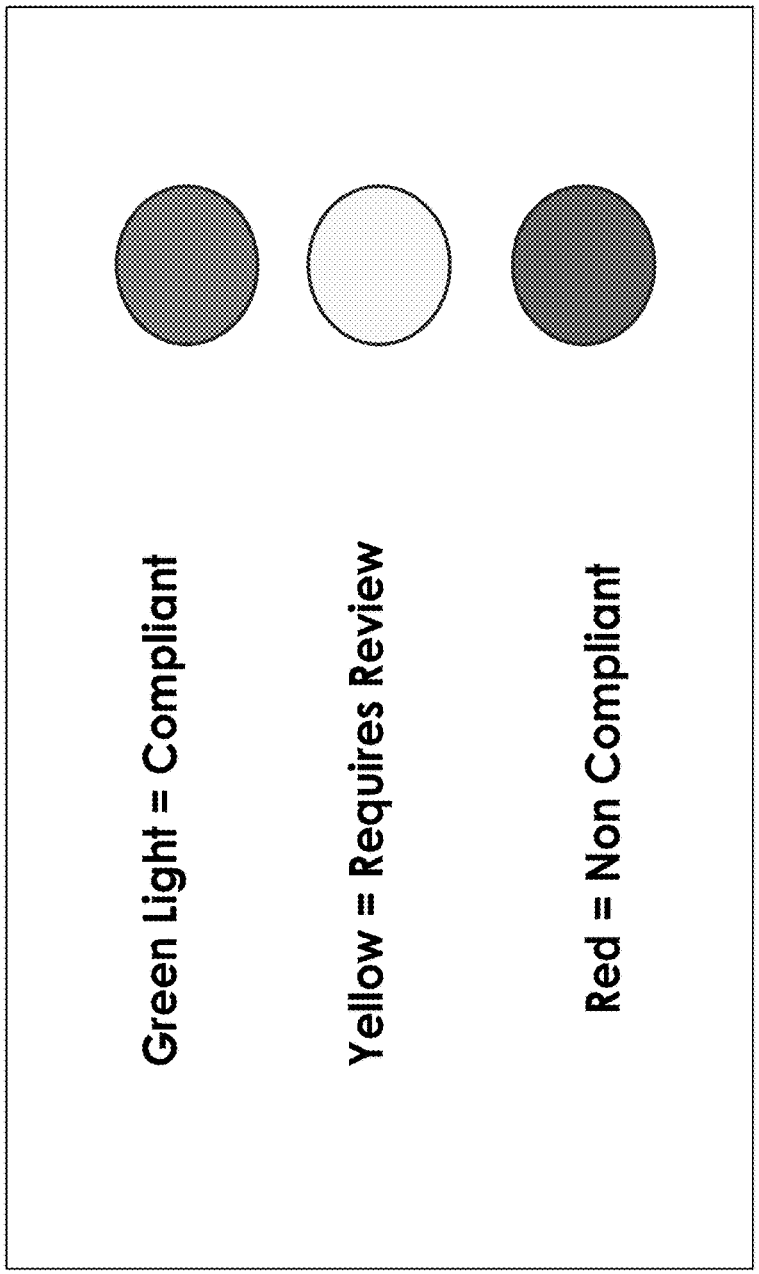
FIG. 17 is an illustration of a standard green/yellow/red light chart of the method of the present invention.
Figure 27:
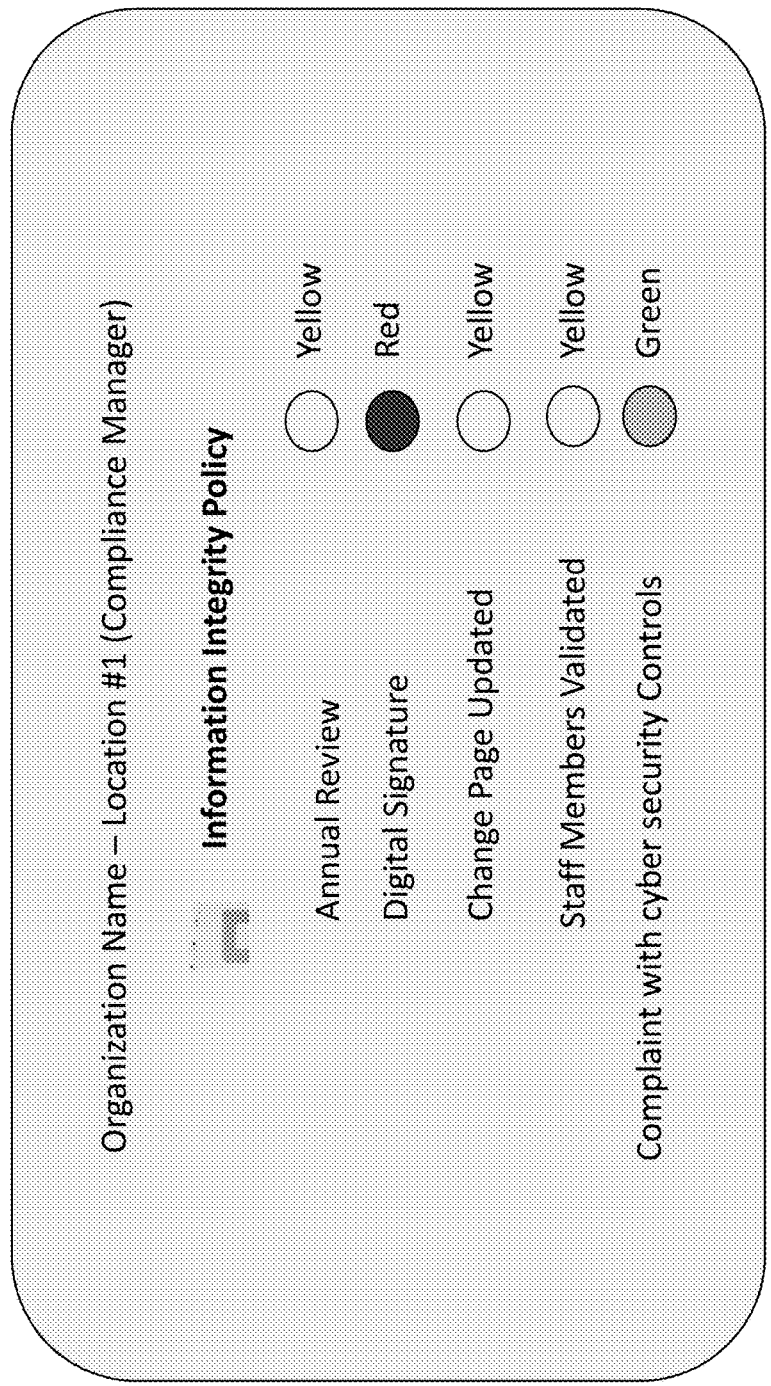
FIG. 27 is an illustration of an exemplary visualization to be displayed if an organization's cyber security controls are determined to be compliant by the method of the present invention.

As can be seen in FIG. 16, and FIG. 27 to FIG. 28, the Watcher method provides a sub-process for assessing cyber security controls for compliance. More specifically, the Watcher method may perform an assessment of cyber security controls of at least one policy document related to the organization in Step D through the remote server, wherein the cyber security controls are assessed against the at least one regulation/standard for compliance. As can be seen in FIG. 28, the specific policy document of the organization is assessed for various requirements per the at least one regulation/standard for compliance. The outcome/result of the assessment is relayed to the specific user through Step E of the Watcher method of the present invention, in any suitable formats, one of which can be seen in FIG. 27 as an example.

Although the invention has been explained in relation to its preferred embodiment, it is to be understood that many other possible modifications and variations can be made without departing from the spirit and scope of the invention as hereinafter claimed.

What is claimed is:

1. A method for facilitating assessment, authorization, and monitoring of organization policy documents, the method comprising the steps of:

(A) providing a plurality of user accounts managed by at least one remote server, wherein the plurality of user accounts includes a plurality of officer accounts and a plurality of general user accounts, and wherein each of the plurality of user accounts is associated with a corresponding personal computing (PC) device;

(B) receiving an indication of at least one policy document from a specific user with the corresponding PC device through the remote server, wherein the indication includes a storage location of the policy document, and wherein the specific user is an officer who is authorized to manage policy documents of an organization;

(C) retrieving at least one regulation of cyber security requirements for policy documents from one or more external databases through the remote server;

(D) analyzing the at least one policy document against the at least one retrieved regulation and generating at least one insight for the policy document through the remote server;

(E) relaying the at least one insight for the at least one policy document and displaying on the corresponding PC device of the specific user through the remote server;

managing a monitoring process for policy documents of the organization before step (D) through the remote server;

identifying at least one policy document that needs required actions, wherein required actions for the at least one policy document include analysis of compliance to at least one standard, status check, verification of secured signature, update of changes; and signaling a specific user with the corresponding PC device to take actions for the at least one policy document, wherein the signaling method includes colored light chart to indicate status and/or actions required for the at least one policy document through the remote server.

2. The method for facilitating assessment, authorization, and monitoring of organization policy documents as claimed in claim 1, the method comprising the steps of:
receiving monitoring data for the at least one policy document from at least one of the plurality of users with the corresponding PC device after step (C); and
wherein the monitoring data include the at least one user's interactions with and input relating to the at least one policy document.

3. The method for facilitating assessment, authorization, and monitoring of organization policy documents as claimed in claim 2, the method comprising the steps of:
receiving monitoring data of document access and alteration records made by the at least one user.

4. The method for facilitating assessment, authorization, and monitoring of organization policy documents as claimed in claim 2, the method comprising the steps of:
receiving the monitoring data of video and/or audio data; and
wherein the video and/or audio data are acquired through sensory devices of the organization.

5. The method for facilitating assessment, authorization, and monitoring of organization policy documents as claimed in claim 2, the method comprising the steps of:
receiving the monitoring data of biometric data; and
wherein the biometric data are acquired by the use of at least one biometric sensor of the organization.

6. The method for facilitating assessment, authorization, and monitoring of organization policy documents as claimed in claim 1, the method comprising the steps of:
receiving at least one policy document related to the organization from a specific user with the corresponding PC device in step (B) through the remote server;
analyzing the at least one policy document to verify a digital signature associated with the policy document; and
generating a notification of the verification of the digital signature associated with the policy document.

7. The method for facilitating assessment, authorization, and monitoring of organization policy documents as claimed in claim 6, the method comprising the steps of:
managing a plurality of digital signatures to authenticate policy documents for the organization; and
analyzing at least one current digital signature against the plurality of digital signatures through the remote server.

8. The method for facilitating assessment, authorization, and monitoring of organization policy documents as claimed in claim 1, the method comprising the steps of:
performing a required periodic review of the at least one policy document; and
wherein the periodic review is performed per a predetermined schedule through the remote server.

9. The method for facilitating assessment, authorization, and monitoring of organization policy documents as claimed in claim 1, the method comprising the steps of:
performing a required tampering check of the at least one policy document; and
wherein the tampering check is performed using an MD5 (Message Digest algorithm 5) hashing method through the remote server.

10. The method for facilitating assessment, authorization, and monitoring of organization policy documents as claimed in claim 1, the method comprising the steps of:
reporting of at least one policy document related to the organization to a specific user with the corresponding PC device after step (D) through the remote server;
wherein the reporting includes a current status of policy document compliance to at least one regulation/standard; and
wherein the reporting also includes required actions for the policy document to meet compliance to the at least one regulation/standard.

11. The method for facilitating assessment, authorization, and monitoring of organization policy documents as claimed in claim 10, the method comprising the steps of:
creating a specific report from a plurality of reports for the at least one policy documents; and
wherein the specific report includes status and/or required actions for compliance through the remote server.

12. The method for facilitating assessment, authorization, and monitoring of organization policy documents as claimed in claim 1, the method comprising the steps of:
performing an assessment of cyber security controls of at least one policy document related to the organization in step (D) through the remote server; and
wherein the cyber security controls are assessed against at least one regulation/standard for compliance.

\* \* \* \* \*